United States Patent
Eash et al.

(10) Patent No.: US 12,498,576 B2
(45) Date of Patent: *Dec. 16, 2025

(54) DISPLAY SYSTEM FOR A HEAD MOUNTED DEVICE

(71) Applicant: Avegant Corp., San Mateo, CA (US)

(72) Inventors: Aaron Matthew Eash, San Francisco, CA (US); Andrew John Gross, Chassell, MI (US); Edward Chia Ning Tang, Menlo Park, CA (US); Warren Cornelius Welch, III, Foster City, CA (US); Christopher David Westra, San Carlos, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,998

(22) Filed: Dec. 27, 2023

(65) Prior Publication Data
US 2024/0201497 A1 Jun. 20, 2024

Related U.S. Application Data

(63) Continuation of application No. 17/812,149, filed on Jul. 12, 2022, now Pat. No. 11,860,367.

(60) Provisional application No. 63/203,174, filed on Jul. 12, 2021.

(51) Int. Cl.
G02B 27/00 (2006.01)
G02B 13/16 (2006.01)
G02B 27/01 (2006.01)

(52) U.S. Cl.
CPC ......... *G02B 27/0172* (2013.01); *G02B 13/16* (2013.01); *G02B 27/0037* (2013.01); *G02B 27/0068* (2013.01); *G02B 2027/0116* (2013.01)

(58) Field of Classification Search
None
See application file for complete search history.

(56) References Cited

U.S. PATENT DOCUMENTS

| 4,518,231 A | 5/1985 | Muchel et al. |
| 6,361,166 B1 * | 3/2002 | Perrott ............... A61F 9/022 351/159.01 |
| 9,335,541 B2 * | 5/2016 | Silverstein ........... H04N 13/334 |

(Continued)

FOREIGN PATENT DOCUMENTS

| CN | 105319718 A | 2/2016 |
| CN | 105929545 A | 9/2016 |

(Continued)

OTHER PUBLICATIONS

Apochromatic Optical Design, Taylor Optics Digest, retrieved from Internet on May 21, 2021, https://taylortechassoc.com/?page_id=1344, 14 pages.

(Continued)

*Primary Examiner* — Martin Mushambo
(74) *Attorney, Agent, or Firm* — Nicholson De Vos Webster & Elliott LLP; Judith Szepesi

(57) ABSTRACT

A display system for a head mounted device (HMD) including a lens comprising a display area on the lens of the HMD, the lens having a base angle and a pantoscopic tilt, a display engine and optics, and a prism to redirect output from the optics to the display area on the lens of the HMD, accounting for the base angle and the pantoscopic tilt.

20 Claims, 15 Drawing Sheets

(56) References Cited

U.S. PATENT DOCUMENTS

| | | | |
|---|---|---|---|
| 10,650,785 B1 | 5/2020 | Tuomisto et al. | |
| 10,768,449 B2* | 9/2020 | Silverstein | G02C 7/107 |
| 2008/0080059 A1 | 4/2008 | Dixon et al. | |
| 2009/0046245 A1* | 2/2009 | Politzer | G02C 7/14 |
| | | | 351/159.58 |
| 2011/0012874 A1* | 1/2011 | Kurozuka | G02B 26/105 |
| | | | 345/204 |
| 2014/0240470 A1* | 8/2014 | Dias Da Silva | G02C 13/005 |
| | | | 348/49 |
| 2015/0003796 A1 | 1/2015 | Bennett | |
| 2015/0085244 A1* | 3/2015 | Carter | G02C 5/2209 |
| | | | 351/140 |
| 2016/0334562 A1 | 11/2016 | Richards et al. | |
| 2017/0031435 A1* | 2/2017 | Raffle | G02B 27/017 |
| 2017/0059879 A1 | 3/2017 | Vallius | |
| 2017/0212360 A1 | 7/2017 | Yang et al. | |
| 2017/0329137 A1 | 11/2017 | Tervo | |
| 2018/0067340 A1* | 3/2018 | Chumbley | G02C 7/027 |
| 2018/0095279 A1* | 4/2018 | Bouchier | G02C 7/024 |
| 2018/0143427 A1* | 5/2018 | Griffin | G02B 5/18 |
| 2018/0149791 A1 | 5/2018 | Urness et al. | |
| 2018/0188542 A1 | 7/2018 | Waldern et al. | |
| 2019/0004325 A1* | 1/2019 | Connor | G02B 27/0172 |
| 2019/0043392 A1* | 2/2019 | Abele | G09G 3/001 |
| 2019/0212563 A1 | 7/2019 | Schultz et al. | |
| 2019/0227319 A1 | 7/2019 | Trail et al. | |
| 2019/0235625 A1 | 8/2019 | Jeong | |
| 2020/0088931 A1 | 3/2020 | Urness et al. | |
| 2020/0103654 A1* | 4/2020 | Cheng | G02B 27/0172 |
| 2020/0150405 A1 | 5/2020 | Bates et al. | |
| 2020/0153203 A1* | 5/2020 | Hatzilias | H01S 5/183 |
| 2020/0278547 A1* | 9/2020 | Singer | G02B 27/4272 |
| 2021/0141212 A1* | 5/2021 | Jacoby | G02B 27/0172 |
| 2021/0165223 A1* | 6/2021 | Petignaud | G02B 27/0172 |
| 2021/0208407 A1 | 7/2021 | Eash et al. | |
| 2021/0341739 A1* | 11/2021 | Cakmakci | G02C 7/086 |
| 2021/0341740 A1* | 11/2021 | Cakmakci | G02B 27/0025 |
| 2022/0397765 A1* | 12/2022 | Cakmakci | G02B 17/0856 |
| 2022/0404595 A1 | 12/2022 | Bates et al. | |
| 2023/0266593 A1* | 8/2023 | Eisenfeld | G02B 27/005 |
| | | | 385/31 |

FOREIGN PATENT DOCUMENTS

| | | |
|---|---|---|
| CN | 104614858 B | 2/2017 |
| CN | 109154722 A | 1/2019 |
| CN | 112180606 A | 1/2021 |
| CN | 112180607 A | 1/2021 |
| CN | 112969953 A | 6/2021 |
| EP | 0601873 A1 | 6/1994 |
| WO | 2017/219433 A1 | 12/2017 |
| WO | 2020/205101 A1 | 10/2020 |

OTHER PUBLICATIONS

International Search Report and Written Opinion, PCT App. No. PCT/US2022/073653, Oct. 7, 2022, 9 pages.
Notice of Allowance, U.S. Appl. No. 17/812,149, Jul. 24, 2023, 11 pages.
Anonymous, "Compound prism—Wikipedia", XP093257448, Retrieved from the Internet <https://en.wikipedia.org/w/index.php?title=Compound_prism&oldid=88886692>, Mar. 21, 2019, 4 pages.
Extended European search report and Search Opinion, EP App. No. 22843026.0, Mar. 24, 2025, 11 pages.
First Office Action, CN App. No. 202280049393.8, Feb. 13, 2025, 16 pages (08 pages of English Translation and 08 pages of Original Document.
Kress Bernard C. et al: "Waveguide combiners for mixed reality headsets: a nanophotonics design perspective", Nanophotonics, vol. 10, No. 1, Oct. 7, 2020, pp. 41-74.

* cited by examiner

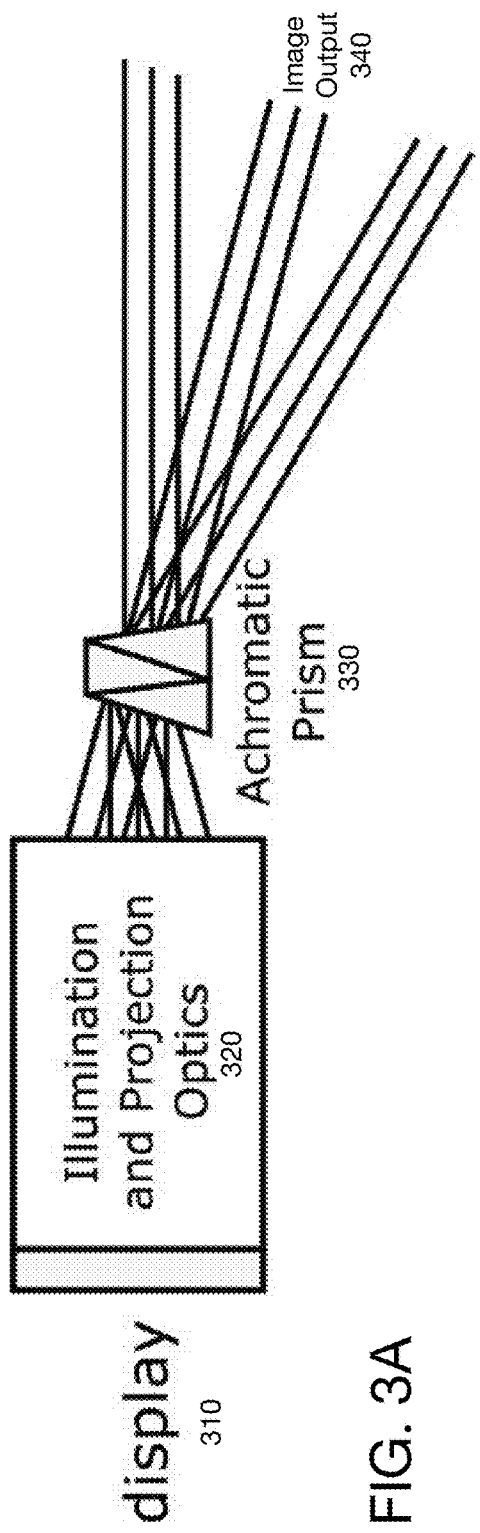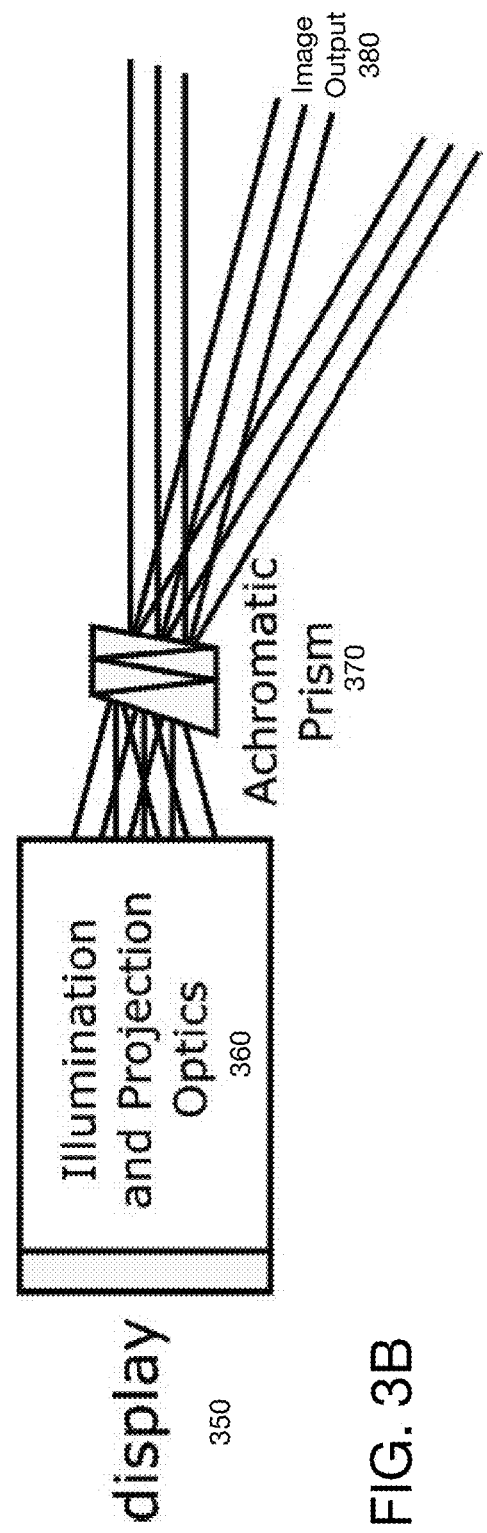
FIG. 3A
FIG. 3B

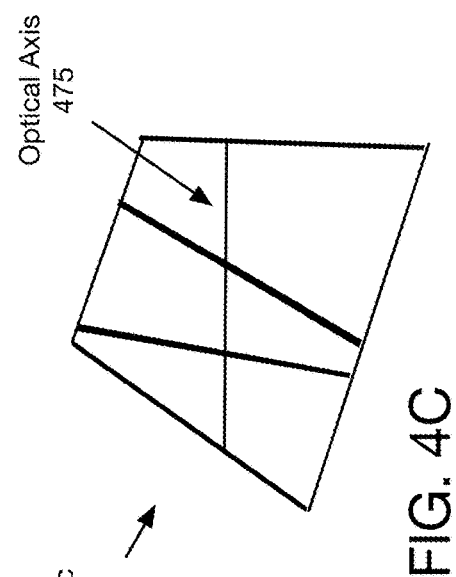
FIG. 4B
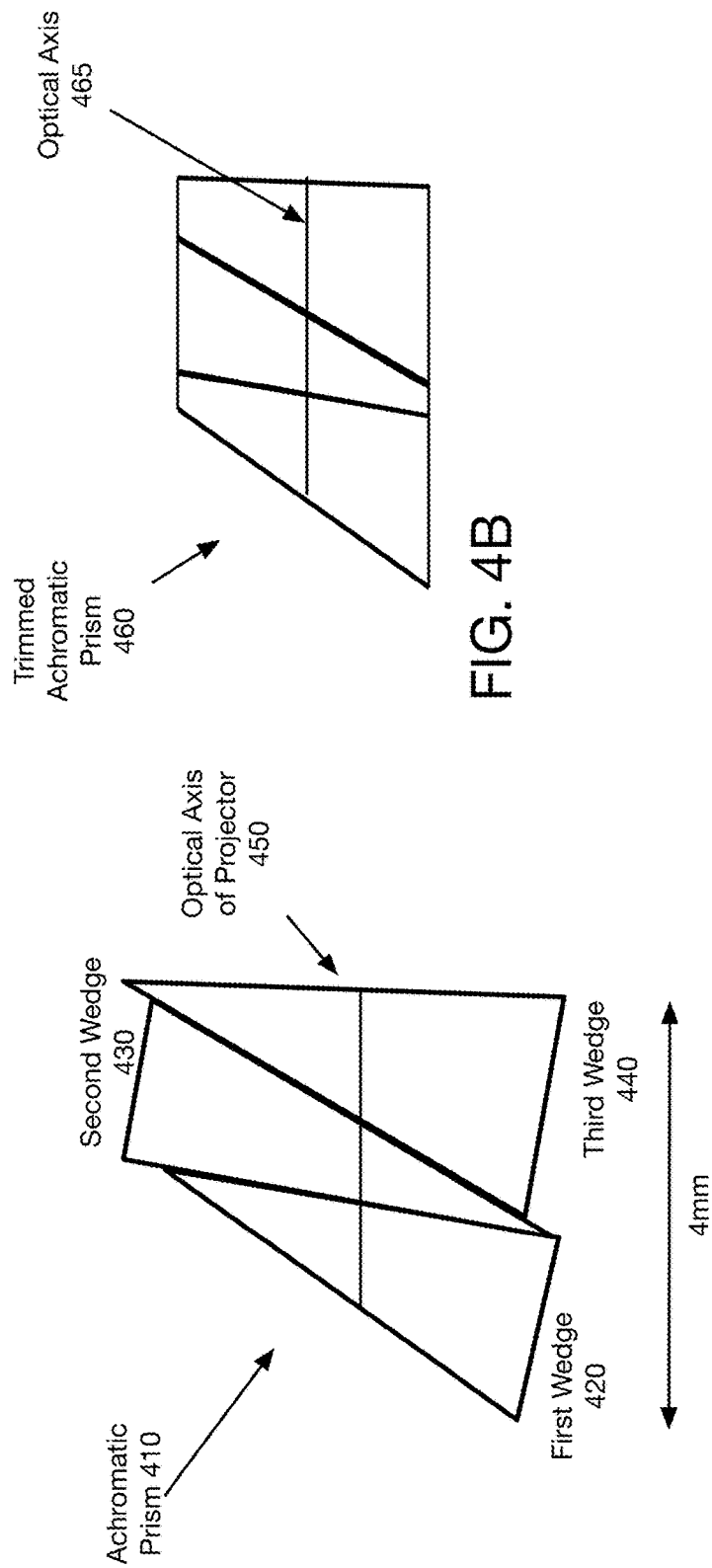
FIG. 4C
FIG. 4A

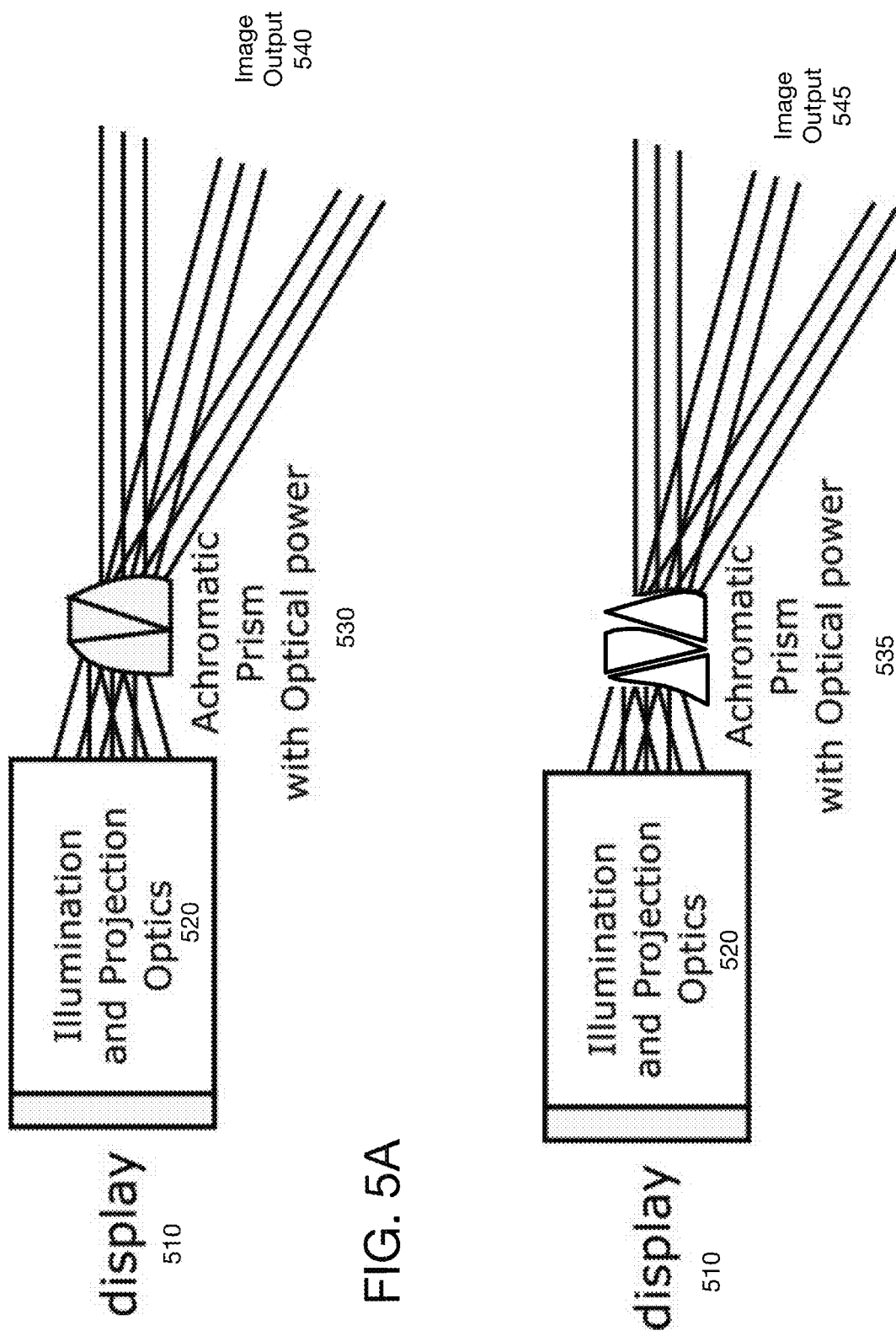

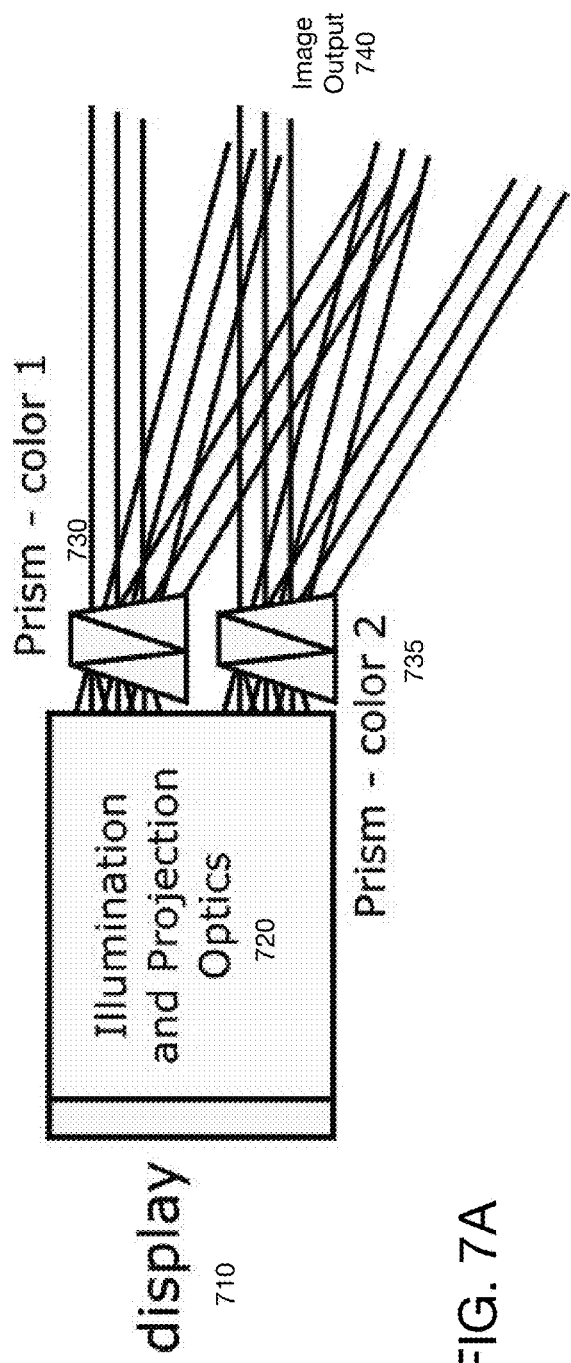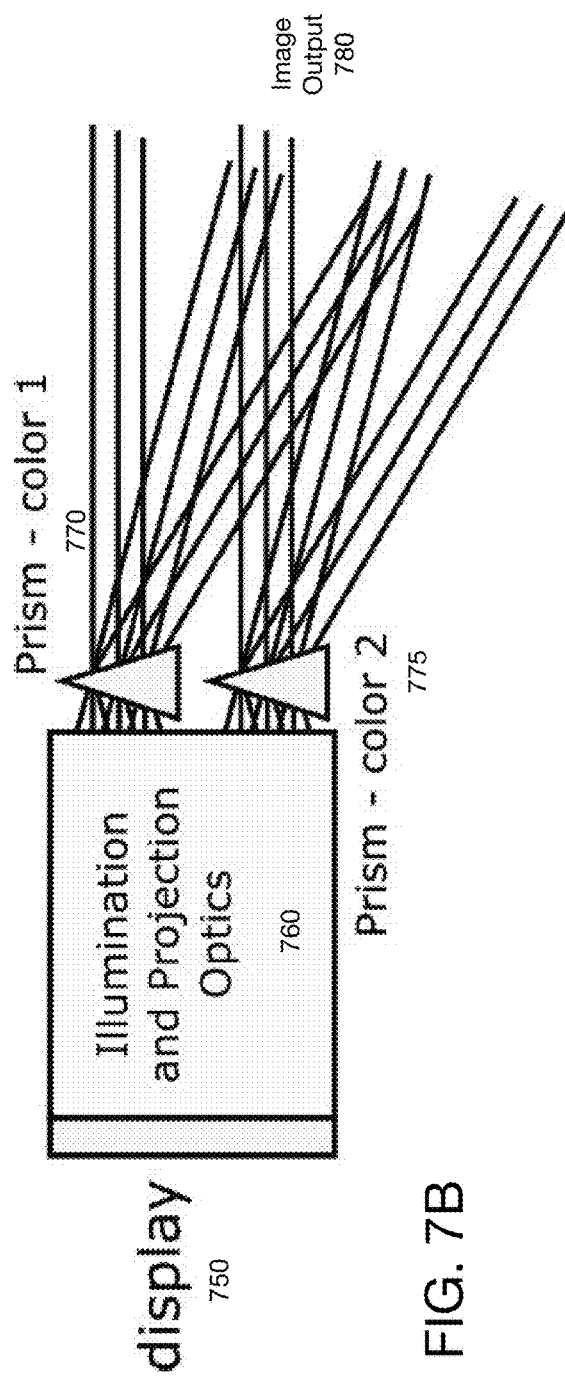
FIG. 7A
FIG. 7B

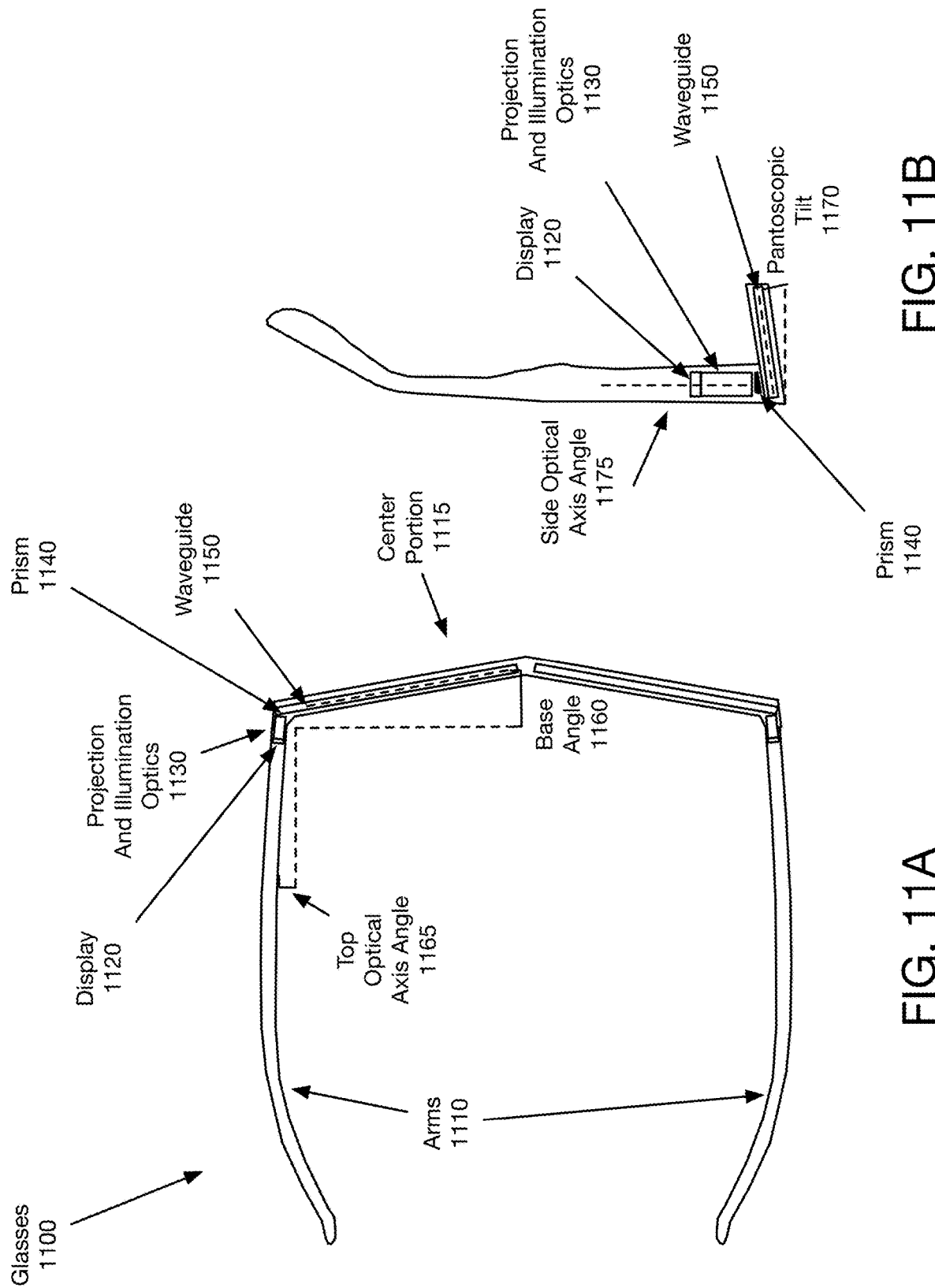

DISPLAY SYSTEM FOR A HEAD MOUNTED DEVICE

RELATED APPLICATION

The present application is a continuation of U.S. application Ser. No. 17/812,149, filed Jul. 12, 2022, issuing as U.S. Pat. No. 11,860,367 on Jan. 2, 2024, which application claims priority to U.S. Provisional Application No. 63/203,174 filed on Jul. 12, 2021, and incorporates those applications in their entirety.

FIELD

The present invention relates to displays and more particularly to decoupling a position of the light engine and optics from the image position.

BACKGROUND

In head-mounted devices (HMDs), setting the configuration of the display, illumination and projection optics, and the location to which the image is projected is complicated. FIG. 1A illustrates a typical display 110, optics 120, and image output 130. In general, the illumination and projection optics are in a line, and the output of the optics is displayed to a user.

FIGS. 1B and 1C illustrate a typical display 140, with illumination and projection optics 150, the output of which is input to a waveguide 160. This enables displacing the image output 170 from the position of the display 140 and optics 150. As can be seen in FIG. 1C, when the output of the optics 150 is in-coupled into waveguide 160 at an angle, the light out-coupled from the waveguide 160 exits at an angle as well.

BRIEF DESCRIPTION OF THE FIGURES

The present invention is illustrated by way of example, and not by way of limitation, in the figures of the accompanying drawings and in which like reference numerals refer to similar elements and in which:

FIG. 3A is an illustration of one embodiment of the system including an achromatic prism.

FIG. 3B is an illustration of another embodiment of the system with an achromatic prism.

FIGS. 4A-4C are illustrations of embodiments of the achromatic prism.

FIG. 5A is an illustration of one embodiment of the system with an achromatic prism with optical power.

FIG. 5B is an illustration of one embodiment of the system with an achromatic prism, in which the wedges in the achromatic prism all have optical power.

FIG. 7A is an illustration of one embodiment of the system with two exit pupils, using an achromatic prism.

FIG. 7B is an illustration of one embodiment of the system with two exit pupils with laser illumination.

FIGS. 11A and 11B are illustrations of one embodiment of glasses showing the present system.

DETAILED DESCRIPTION

Figure 1A:
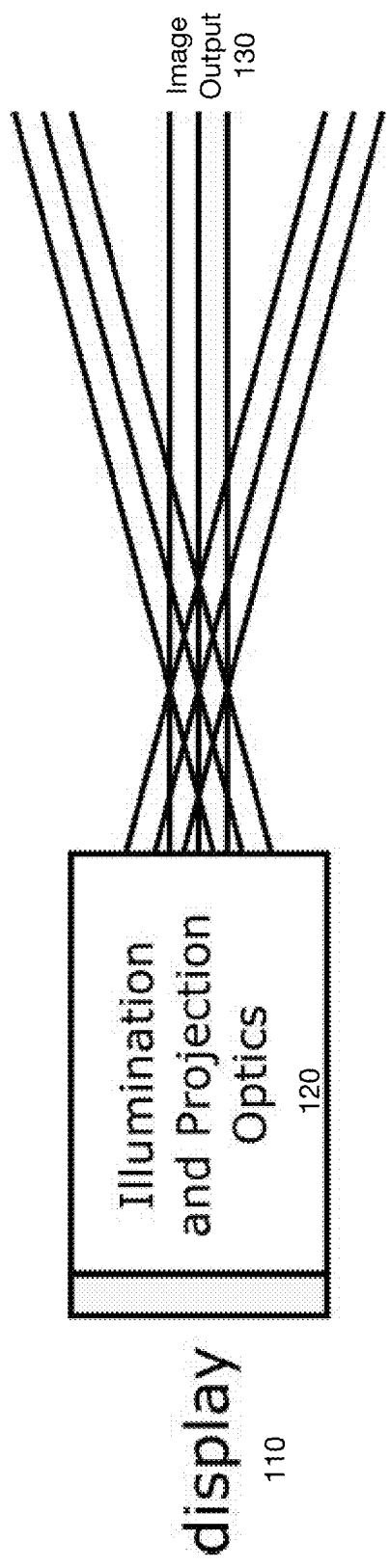
FIG. 1A is an illustration of one embodiment of a prior art standard display engine.
Figure 1B:
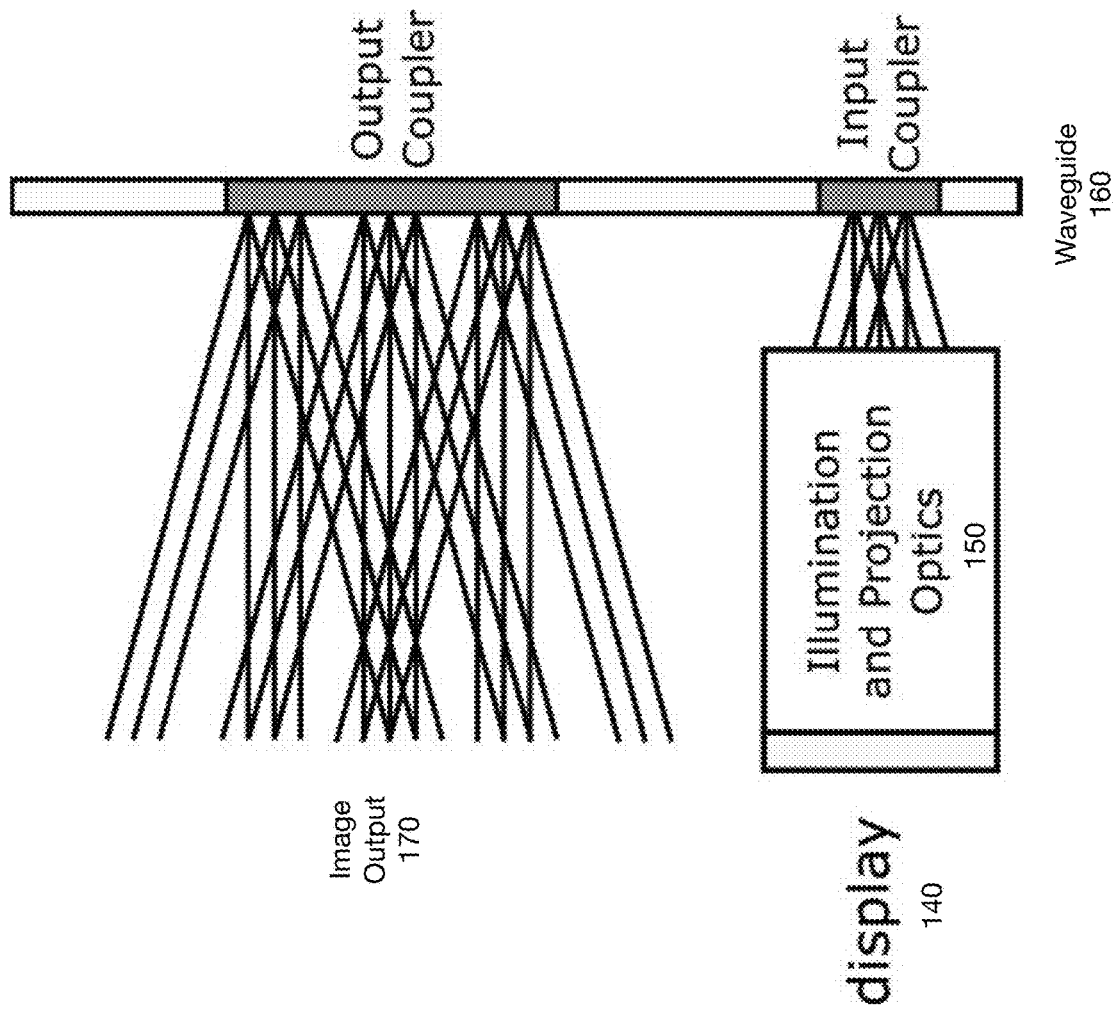
FIG. 1B is an illustration of one embodiment of a prior art standard display engine with a waveguide.
Figure 1C:
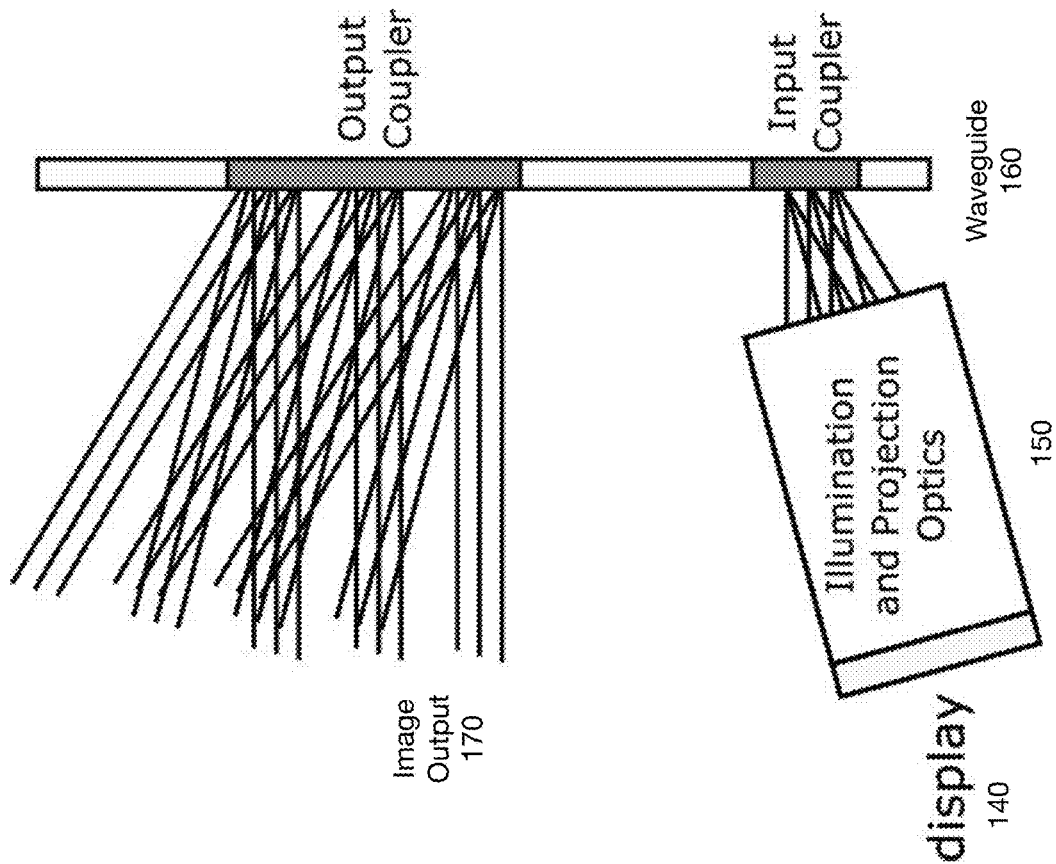
FIG. 1C is an illustration of one embodiment of a prior art standard display engine with a waveguide, when the light enters at an angle.

The present system provides a design for a head-mounted display that enables the displacement of the display and optics elements from the position of the displayed image. A prism is used to shift the exit beam angle, and thus the position of the output image. In one embodiment, the prism is designed to shift the image so that the output axis does not line up with the axis of the rest of the system. In one embodiment, an achromatic prism is used.

The design accounts for a display to a lens that has a pantoscopic tilt and a base angle, enabling display in a head mounted device (HMD) form factor. In one embodiment, this enables the display system to fit into a glasses form factor, while providing good optical performance. In one embodiment, an achromatic prism is used to avoid chromatic aberrations. In another embodiment, a prism with a refractive and diffractive surface is used. In one embodiment, power may be applied to the achromatic prism. In one embodiment, the redirected light from the prism may be directed to the user's eyes through a waveguide. In one embodiment, the system may include multiple exit pupils for different colors, with separate prisms for each exit pupil.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

FIGS. 11A and 11B illustrate one embodiment of glasses which may be designed to provide augmented reality (AR) and/or virtual reality (VR) and/or mixed reality (MR) displays. The image is displayed in one embodiment on a waveguide 1150 embedded in the lenses of the glasses. As can be seen, the waveguide 1150 is not at a normal angle, but rather a compound angle compared to the optics 1130. In this illustration, the optics are embedded in the arms 1110 of the glasses 1100. In other implementations the optics may be positioned in the center area, above the eyes or elsewhere. In any configuration, however, there will generally be a compound angle between the output of the optics 1130 and the in-coupler of the waveguide or other element used for display. The displacement of the output of the optics 1130 from the reference plane may be presented by the optical axis angle (which has a top and side component). Further-more, lenses are generally angled both from the top (base angle) and the side (pantoscopic tilt). There may be tilt along all three axes. The combination of the different angles which make up the total displacement of the in-coupler of the waveguide (or other display element) from the optical axis of the illumination optics 1130 is referred to as a compound angle. Thus, the present design uses a prism to accommodate the compound angle and decouple the position of the display engine and optics from the position of the final image display. This design is flexible enough to accommodate any head mounted display including glasses, goggles, or other display configuration. Of course, these techniques are also applicable for form factors unrelated to glasses, in which the display and illumination/projection optics are positioned at an angle from the output image.

Figure 2:
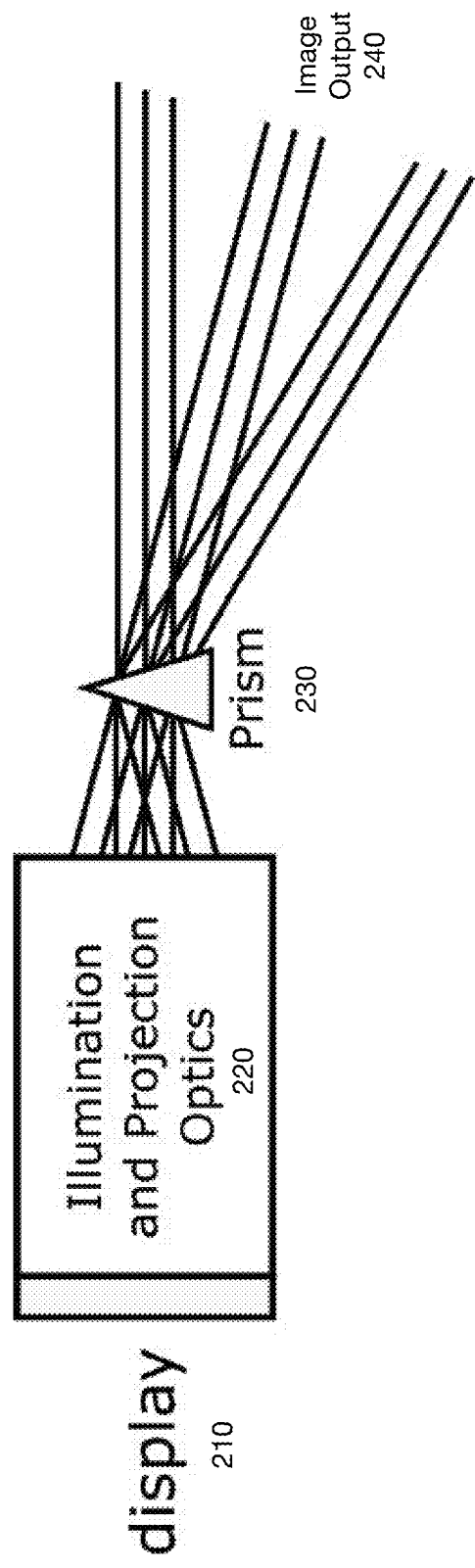
FIG. 2 is an illustration of one embodiment of a display engine with a prism to provide an angled output compared to the position of the optics.

FIG. 2 is an illustration of one embodiment of a display engine with a prism to provide an angled output compared to the position of the optics. This angled output is designed to accommodate the compound angles between the optical axis of the illumination and projection optics 220 and the preferred angle of the image output 240, as described above. The display 210, in one embodiment, may include a light-emitting diode (LED) display, microLED display, scanning laser display, Liquid Crystal on Silicon (LCoS), digital micromirror device (DMD), or another type of display. The output of display 210 passes through one or more illumination and projection optics 220. The use of such optics 220 is known in the art. The optics 220 may include illumination optics, projection optics, or a combination of both illumination and projection optics. Although the optics 220 are shown as a simple block, one of skill in the art would understand that such optics may include various lenses and mirrors. In one embodiment, the elements which are included in the illumination and projection optics may include one or more lenses, mirrors, holographic optical elements, and other optical elements.

The output of optics 220 is passed to prism 230. The prism 230 changes the exit angle of the light, to position output image 240 at the correct angle for the display. However, using a single prism 230 may cause some issues, such as chromatic aberrations. The system may utilize a variety of modifications to prism 230 to address these chromatic aberrations. Exemplary modifications to the prism 230 are described below.

FIG. 3A is an illustration of one embodiment of the system including an achromatic prism. The achromatic prism 330 enables the change in the angles of the light from illumination and projection optics 320, without chromatic aberrations. In one embodiment, the achromatic prism 330 is multiple prisms with different types of glass with different refractive indexes, bonded together. In one embodiment, the types of glass or other material used defines the number of wedges. In one embodiment, the shape, size, and materials of the achromatic prism are selected based on the bandwidth of the light (i.e. the specific wavelength range), along with the pupil size, and the angles of deflection.

In one embodiment, the prisms are made of three wedges, each wedge made of glass from SCHOTT AG. In one exemplary embodiment, the three wedges are N-PSK57, N-KZFS5 and N-FK56 glass. In one exemplary embodiment, the refractive indexes for the three wedges are 1.58700, 1.65412, and 1.48656. In another embodiment, the wedges can be made from materials from other manufacturers' glass lists, such as OHARA CORPORATION, HOYA OPTICS, or SUMITOMO ELECTRIC INDUSTRIES. Each of the wedges may be made of a different material. In one embodiment, the wedges may be made of material other than glass, such as plastic, ceramic, or other optical materials. Alternatively, the wedges may be made of two types of materials (M1 and M2), so the three wedges are M1/M2/M1 configuration. The higher refractive index causes a higher chromatic dispersion, so by utilizing a range of indexes, the achromatic prism provides a range of dispersions, balancing the system and reducing or eliminating chromatic aberrations. In one embodiment, the materials used may include glass, plastic, and other optical materials.

In one embodiment, the achromatic prism 330 may have the wedges bonded to each other with optically clear bonding materials. In one embodiment, the achromatic prism 330 may be unbonded wedges placed in close proximity. In one embodiment, the achromatic prism comprises three wedges, as shown in FIG. 3A. In one embodiment, the wedges are not the same size.

FIG. 3B is an illustration of another embodiment of the system with an achromatic prism. This configuration illustrates an achromatic prism 370 including four wedges. The achromatic prism 370, in one embodiment, may include two or more wedges.

FIGS. 4A-4C are illustrations of embodiments of the achromatic prism. An achromatic prism is a prism which is designed to redirect light without spectral separation, also referred to as chromatic aberration, caused by standard prisms.

The achromatic prism 410 is positioned at an angle to the optical axis of the projector 450 as shown. The projector, in this context, is the output of the illumination and projection optics, which direct the light into the achromatic prism 410. The wedges 420, 430, 440 of the achromatic prism 410, in one embodiment, are shifted with respect to each other, as shown. The achromatic prism 410, in one embodiment, can shift the angle of the light to accommodate any compound angle, and thus address both pantoscopic tilt and base angle tilt of head mounted displays. This enables a system in which the light engine is kept at a different orientation from the in-coupler of a waveguide or other output element, allowing the system to be fitted into an HMD form factor. In one embodiment, the particular materials and order of materials for the wedges making up the achromatic prism 410 is selected based on the configuration of the HMD into which the design is to be fitted. This enables the present architecture to accommodate a variety of HMD configurations.

In one embodiment, the prism may be trimmed, to produce a trimmed achromatic prism 460, 470. In one embodiment, the trimmed prism is trimmed based on the exit pupil of the optics used, to ensure that its size captures the full image. Trimming the top and bottom of the prism saves on space and weight, both important considerations in head-mounted devices. FIGS. 4B and 4C show two potential configurations for trimming the achromatic prism, showing the optical axis 465, 475. One of skill in the art would understand that these are merely exemplary trimming approaches, and the actual trim is selected based on image size and location constraints.

FIG. 5A is an illustration of one embodiment of the system with an achromatic prism with optical power. In this configuration, one or more of the wedges in the achromatic prism 530 have an optical power applied to them. In one embodiment, this is done by providing a curvature to the outside surface of the wedge, to converge or diverge the light. In one embodiment, the optical power is provided by molding the wedge to have a curved surface to provide the optical power. In another embodiment, a lens may be glued to the prism to provide the optical power. In the illustration, the first and third wedge are shown to have optical power.

The curvature shown is exaggerated. In some embodiments, all of the wedges may have optical power. In some embodiments, only the outside two wedges may have optical power. In some embodiments, only one of the wedges may have optical power. Other configurations may be used. FIG. 5B illustrates an embodiment in which the wedges in the achromatic prism 535 all have optical power, and the wedges are closely proximate but not touching.

Figure 5C:
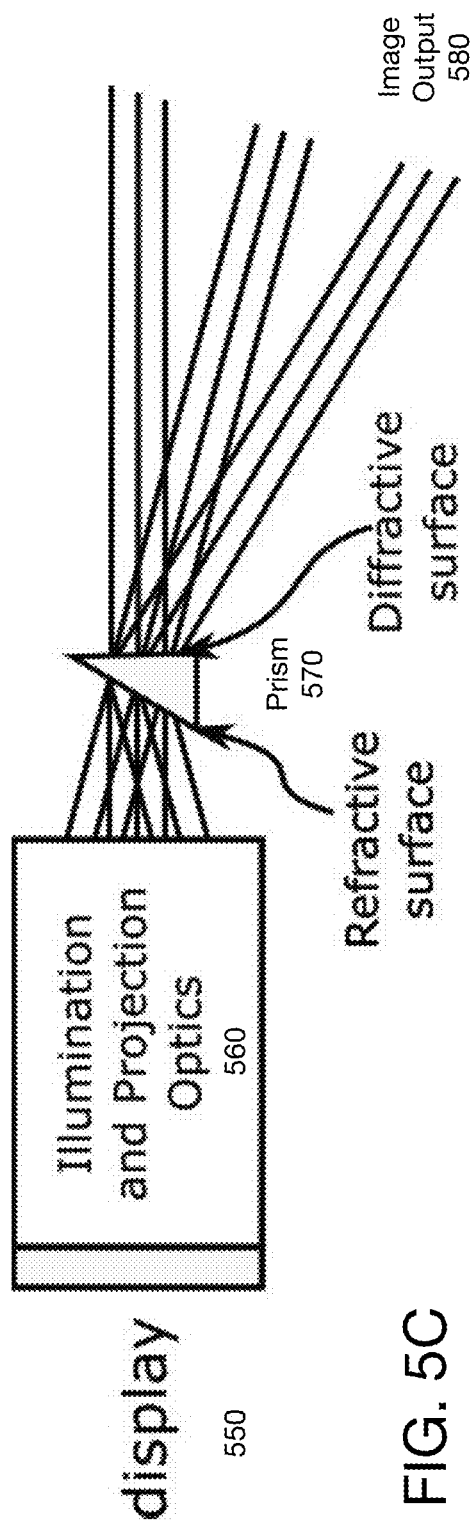
FIG. 5C is an illustration of one embodiment of the system with a refractive/diffractive prism.

FIG. 5C is an illustration of one embodiment of the system with a refractive/diffractive prism. In one embodiment, rather than having three or more wedges, the prism may be a single prism which is a refractive element with a diffractive surface. In one embodiment, one or more of the wedges in an achromatic prism may be a refractive/diffractive prism. In one embodiment, the prism 570 is a refractive element, with a diffractive exit surface. In one embodiment, the diffractive exit surface may be made by applying a diffractive grating to the prism 570. In one embodiment, the diffractive grating may be a surface relief grating, a volume phase holography grating, digital planar holography grating, or another grating.

Figure 6:
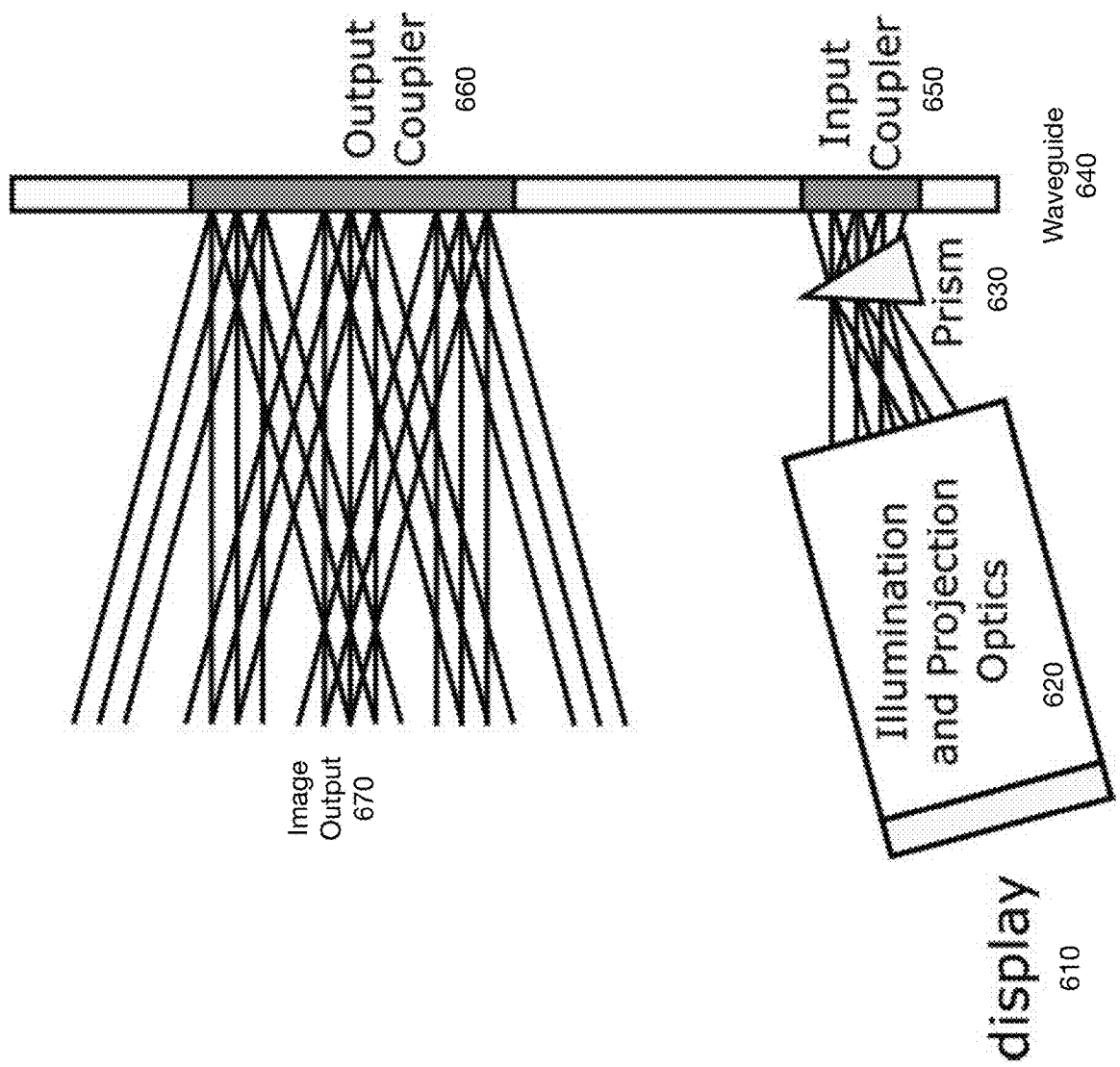
FIG. 6 is an illustration of one embodiment of the system with a prism and a waveguide.

FIG. 6 is an illustration of one embodiment of the system with a prism and a waveguide. In some embodiments, the output of the prism 630 is not output to the user's eye directly. Rather, the output of the prism 630 is an input to a waveguide. This enables further movement of the display 610 and optics 620 from the image output 670 location. As can be seen, although the illumination and projection optics 620 are angled with respect to the waveguide 640, the use of prism 630 enables the correction of those angles, so that the light enters the input coupler 650 of the waveguide 640 at the correct angle, and the image output 670 through output coupler 660 is not skewed. In one embodiment, prism 630 may be a single prism. In another embodiment, prism 630 may be any of the prisms discussed above, such as an achromatic prism, a refractive/diffractive prism, and/or may have optical power applied to it. The use of the prism 630 provides the direction of light from a light engine of arbitrary design, while conforming to the constraints of a glasses form factor.

FIG. 7A is an illustration of one embodiment of the system with two exit pupils, using an achromatic prism. In one embodiment, the display 710 generates light data which is passed through illumination and projection optics 720. The output of the illumination and projection optics 720 are color separated. These color separated outputs are then directed to two or more prisms 730, 735, to produce image output 740. The prisms 730, 735, in one embodiment, are split by wavelength. In one embodiment, the bandwidth of light for each of the color separated outputs is used in selecting the characteristics of the prisms used to make up the achromatic prism.

In one embodiment, each prism 730, 735 redirects a subset of the colors from display 710. In one embodiment, for two prisms, one of the prisms may be for two colors (e.g. red and blue) while the other prism is for the remaining color (e.g. green). In another embodiment, one prism may be for two colors (red and green) while the other prism is for two colors as well (blue and green). Other ways of dividing the colors between the prisms may be used. The light is subsequently combined for display by a waveguide or other element.

FIG. 7B is an illustration of one embodiment of the system with two exit pupils with laser illumination. For a laser display 750, a single prism 770, 775 per color may be used, rather than achromatic prisms, because the narrow bandwidth of the laser light source mitigates the chromatic aberration issue. Thus, the prisms 770, 775 are used to turn the light, but not to correct the aberration. In one embodiment, three output pupils and prisms may be used, one for each color of light in a full color display.

Figure 8A:
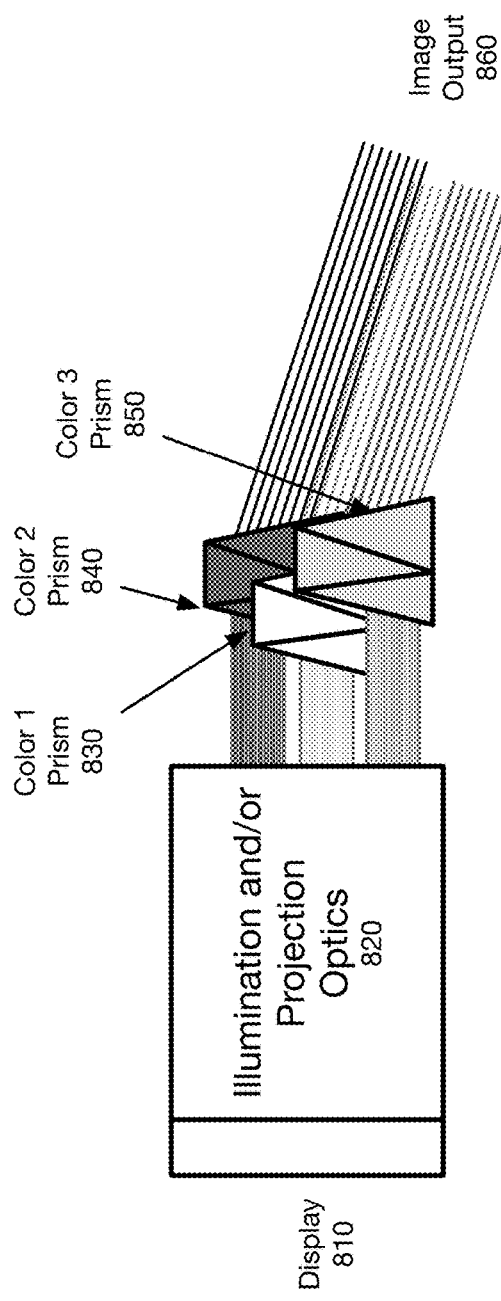
FIGS. 8A and 8B are illustrations of one embodiment of the system with color separated exit pupils.
Figure 8B:
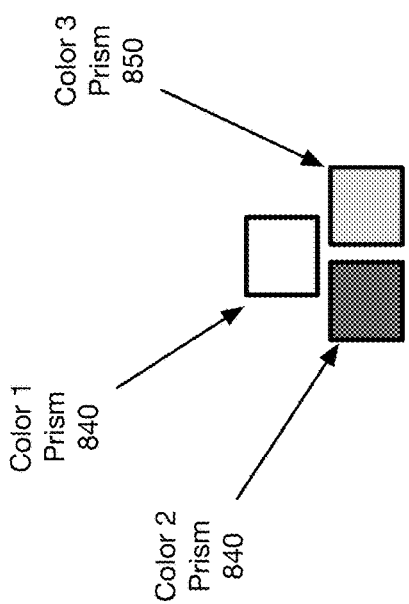

FIGS. 8A and 8B are illustrations of one embodiment of the system with color separated exit pupils. In this illustration, three separate color prisms are shown. Color separated image data from the illumination and projection optics 820 are passed to the three color prisms 830, 840, 850. In one embodiment, the system includes a separate prism for each color. In one embodiment, the prisms 830, 840, 850 are arranged shifted from each other, as shown in FIG. 8B. In one embodiment, the arrangement is three dimensional, and the prisms may be shifted along all three dimensions. In one embodiment, the illumination sources may not be coplanar, and the exit pupils would thus be at different locations relative to the optical engine.

Figure 9A:
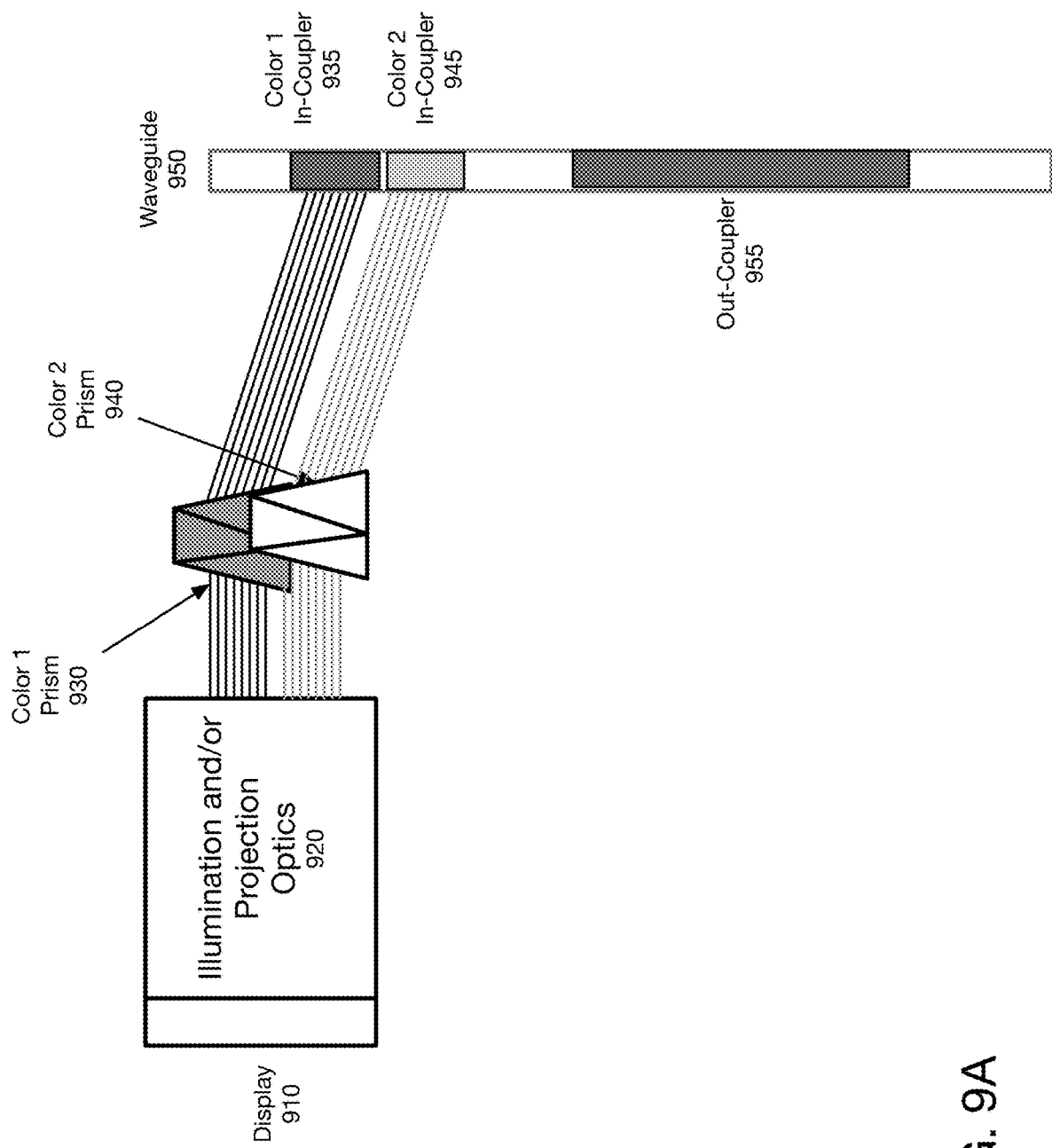
FIG. 9A is an illustration of one embodiment of a system with two exit pupils utilizing a waveguide.

FIG. 9A is an illustration of one embodiment of a system with two exit pupils utilizing a waveguide. The display 910 generates the image data, which is then output by illumination and projection optics 920 to two or three prisms 930, 940. The output of the prisms 930, 940 is coupled into a waveguide 950. In one embodiment the waveguide has a first in-coupler 935 for color 1 and a second in-coupler 945 for color 2. As noted above each of "color 1" and/or "color 2" may represent two colors, e.g., color 1 may be red and blue, while color 2 is green wavelengths. The waveguide in-couplers illustrated may be displaced along both axes. The waveguide 950 includes an out-coupler 955 to out-couple the combined image to the user. Although FIG. 9A illustrates separate in-couplers for the outputs of the two prisms 930, 940, in another embodiment, the waveguide may have a single in-coupler which is used to in-couple the images from both prisms.

Figure 9B:
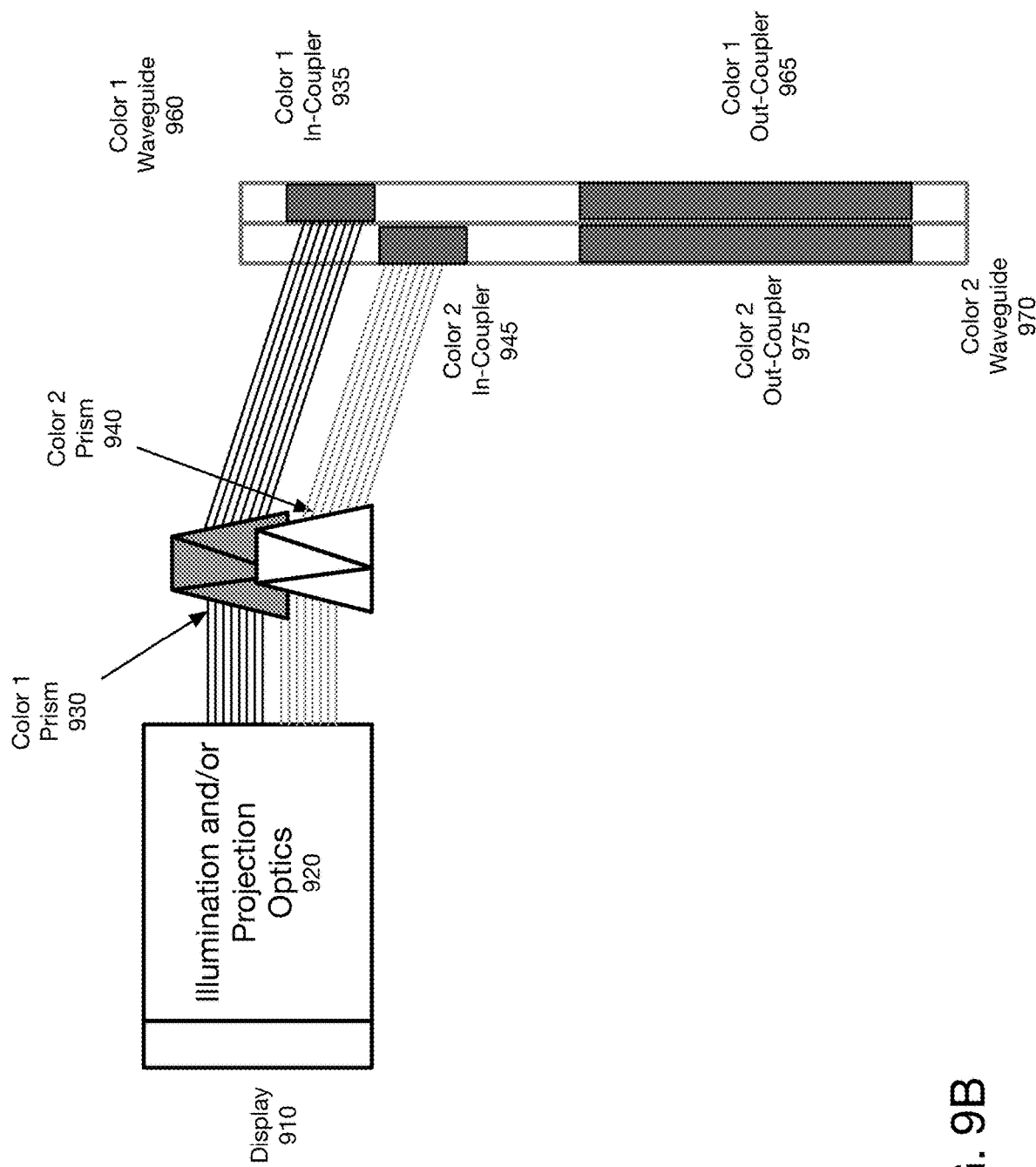
FIG. 9B is an illustration of one embodiment of a system with two exit pupils utilizing two waveguides.

FIG. 9B is an illustration of one embodiment of a system with two exit pupils utilizing two waveguides. The display 910 generates the image data, which is then output by illumination and projection optics 920 to two or three prisms 930, 940. In this configuration, each prism 930, 940 has an associated waveguide 960, 970. In one embodiment, the in-couplers 935, 945 for the waveguides 960, 970 are offset from each other. The out-couplers 965, 975 are positioned over each other, in one embodiment. For a three-prism system, there may be three separate waveguides, in one embodiment. In another embodiment, for a three-prism system there may be two waveguides, one of which transmits the data from two prisms.

In this way, the system can accommodate various configurations of prisms and waveguides.

Figure 10:
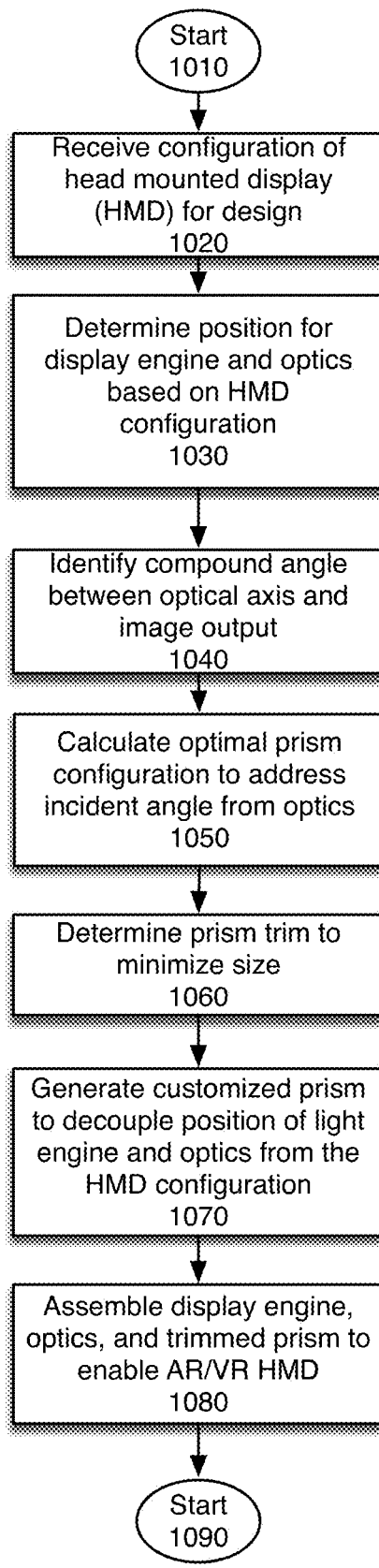
FIG. 10 is a flowchart of one embodiment of utilizing the prism design system.

FIG. 10 is a flowchart of one embodiment of utilizing the prism design system. The process starts at block 1010. At block 1020, the configuration of the HMD for the design is received. FIGS. 11A and 11B illustrate an exemplary configuration of HMD glasses.

At block 1030, the process determines the position for the display engine and optics based on the HMD configuration, which for glasses includes glass lens and frame configuration. In one embodiment, the position of the display engine is generally in the arm of the glasses, in close proximity to the lens. However, in some configurations, the display engine and/or optics may be moved further back along the arm of the glasses, or may be on the center portion of the frame or elsewhere. This defines the optical axis of the display engine and optics.

At block 1040, the compound angle between the optical axis and the image output position is calculated. The image output position may be defined by an in-coupler of a waveguide, in one embodiment. The compound angle may be calculated based on a base angle, pantoscopic tilt, and the optical axis of the output of the projection and intermediate optics block.

At block 1050, the process calculates the optimal prism configuration based on the compound angle, to direct the light from the optics to the display. The prism configuration in one embodiment defines the change in the angle, as well as the selection of the materials to avoid chromatic aberrations. The prism configuration further includes any optical power applied to the prism. In one embodiment, the prism configuration includes the shape, size, and materials of the achromatic prism. These aspects are selected based on the compound angle, the bandwidth of the light (i.e. the specific wavelength range), along with the pupil size.

At block 1060, in one embodiment, the system determines the prism trim, to minimize the size of the prism. The prism may be trimmed to remove the portion of a triangular prism which is not utilized.

At block 1070, in one embodiment, the customized prism is generated, enabling the decoupling of the position of the light engine and optics from the HMD configuration. The display engine, optics, and trimmed prism are, in one embodiment, assembled with the HMD configuration, at block 1080, to enable AR/VR HMDs. The process then ends at block 1090. In this way, the present process enables a design to accommodate various HMD configurations and constraints.

FIGS. 11A-11B are illustrations of one embodiment of glasses in which the present system is used. As can be seen, a pair of glasses 1100 include two arms 1110, which are coupled to a center portion 1115. The center portion 1115 supports two lenses. The lenses have a base angle 1160 and a pantoscopic tilt 1170. In one embodiment, the base angle is between 1 and 10 degrees. In one embodiment, the pantoscopic tilt is between 1-12 degrees. In one embodiment, the optical axis angle is between 0-5 degrees.

The output of any augmented reality (AR) system would be designed to align with the compound displacement angles of glasses. In general, a display engine 1120 is positioned in each of the arms 1110 of the glasses. The illumination and projection optics 1130 are positioned in close proximity to the display engine 1120. However, the actual image output is designed to be positioned on the waveguide 1150 in the lenses of the glasses. Thus, as described herein, a prism 1140 is used to enable positioning of the output of the illumination and projection optics for the actual configuration of such glasses.

In the foregoing specification, the invention has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative rather than a restrictive sense.

The invention claimed is:

1. Augmented reality (AR) glasses comprising:
a lens, having a base angle and a pantoscopic tilt;
a display engine and optics to generate an image, an output of the optics having an optical axis;
a prism to direct the image to a display area on the lens, the prism to set an angle to account for the base angle and the pantoscopic tilt of the lens and the optical axis.

2. The AR glasses of claim 1, further comprising:
a waveguide comprising the display area on the lens, the waveguide positioned in proximity to the prism, wherein the prism is configured to direct the image to an input coupler of the waveguide.

3. The AR glasses of claim 1, further comprising:
a holographic optical element comprising the display area on the lens, the holographic optical element positioned in proximity to the prism, wherein the prism is configured to direct the image to the holographic optical element.

4. The AR glasses of claim 1, wherein the lens has an optical power.

5. The AR glasses of claim 1, wherein the prism is designed to address chromatic aberrations.

6. The AR glasses of claim 5, wherein the prism is an achromatic prism.

7. The AR glasses of claim 6, wherein the achromatic prism comprises three wedges.

8. The AR glasses of claim 6, wherein the prism is trimmed.

9. The AR glasses of claim 5, wherein the prism is a refractive/diffractive prism.

10. The AR glasses of claim 9, wherein an entry surface of the prism is a refractive surface, and an exit surface of the prism is a diffractive surface.

11. The AR glasses of claim 1, wherein the prism comprises a first prism for a first color, and a second prism for a second color.

12. The AR glasses of claim 11, wherein the first color comprises red and blue, and the second color comprises green.

13. The AR glasses of claim 11, wherein the prism comprises a third prism for a third color.

14. Glasses for augmented reality (AR) or virtual reality (VR), the glasses comprising:
a frame;
a lens in the frame, having a base angle and a pantoscopic tilt;
a display engine and optics to generate an image, an output of the optics having an optical axis;
a prism to direct the image to the lens for display, the prism to set an angle to account for the base angle and the pantoscopic tilt of the lens and the optical axis of the output of the optics.

15. The glasses of claim 14, further comprising:
a waveguide on the lens to display the image, the waveguide positioned in proximity to the prism, wherein the prism is configured to direct the image to an input coupler of the waveguide.

16. The glasses of claim 14, further comprising:
a holographic optical element on the lens to display the image, the holographic optical element positioned in proximity to the prism, wherein the prism is configured to direct the image to the holographic optical element.

17. The glasses of claim 14, wherein the prism is an achromatic prism, comprising three wedges.

18. The glasses of claim 14, wherein an entry surface of the prism is a refractive surface, and an exit surface of the prism is a diffractive surface.

19. The glasses of claim 14, wherein the prism comprises a first prism for a first color, and a second prism for a second color.

20. The glasses of claim 19, wherein the prism comprises a third prism for a third color.

* * * * *